United States Patent [19]

Nelson

[11] Patent Number: 4,790,985
[45] Date of Patent: Dec. 13, 1988

[54] SYNTHESIS OF SODIUM ALUMINUM HYDRIDE

[75] Inventor: Gunner E. Nelson, Baton Rouge, La.

[73] Assignee: Ethyl Corporation, Richmond, Va.

[21] Appl. No.: 72,628

[22] Filed: Jul. 13, 1987

Related U.S. Application Data

[63] Continuation-in-part of Ser. No. 919,658, Oct. 16, 1986, abandoned, which is a continuation-in-part of Ser. No. 457,897, Jan. 14, 1983, abandoned.

[51] Int. Cl.$^4$ .............................................. C01B 6/24
[52] U.S. Cl. .................................................... 423/644
[58] Field of Search ......................................... 423/644

[56] References Cited

U.S. PATENT DOCUMENTS

| | | |
|---|---|---|
| 3,138,433 | 6/1964 | Guidice .............................. 423/644 |
| 3,210,150 | 10/1965 | Powers ............................... 423/644 |
| 3,387,933 | 6/1968 | Snyder ............................... 423/644 |
| 3,387,949 | 6/1968 | Snyder ............................... 423/644 |
| 3,505,036 | 4/1970 | Lindsay .............................. 423/644 |
| 4,456,584 | 6/1984 | Gautreaux ........................... 423/644 |
| 4,529,580 | 7/1985 | Nelson ............................... 423/644 |

FOREIGN PATENT DOCUMENTS

| | | | |
|---|---|---|---|
| 1084700 | 7/1960 | Fed. Rep. of Germany ...... | 423/644 |
| 186983 | 10/1966 | U.S.S.R. ............................. | 423/644 |
| 1105167 | 3/1968 | United Kingdom ................ | 423/644 |
| 1185707 | 3/1970 | United Kingdom ................ | 423/644 |

OTHER PUBLICATIONS

Zakhoukin et al, "Acad. of Sciences, USSR, Proceedings", vol. 145, Aug. 1962, pp. 656-658.
Ashby et al, "Inorg. Chem.," vol. 2, No. 3, Jun. 1963, pp. 499-504.

Primary Examiner—John Doll
Assistant Examiner—Wayne A. Langel
Attorney, Agent, or Firm—Robert A. Linn; John F. Sieberth

[57] ABSTRACT

In the direct synthesis process for producing NaAlH$_4$ (pressure hydrogenation of Na and Al in a liquid phase reaction medium at an elevated temperature) advantages are realized by insuring that the initial reaction mixture contains a small amount of water and/or an alcohol. In particular, the induction period is shortened. And, the time, trouble and expense of purifying and pre-drying the reaction medium are avoided.

24 Claims, 1 Drawing Sheet

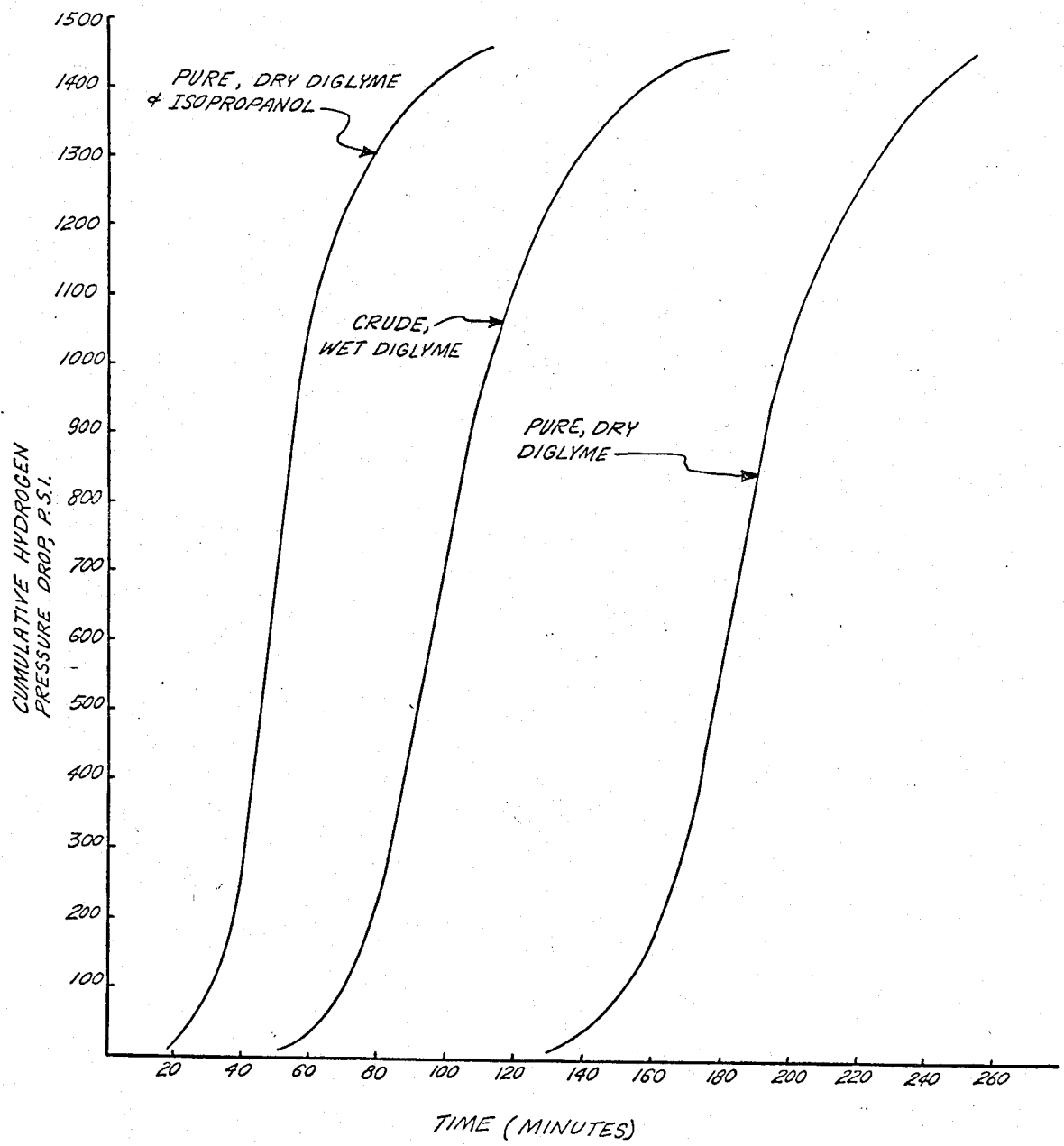

SYNTHESIS OF SODIUM ALUMINUM HYDRIDE

CROSS-REFERENCE TO RELATED APPLICATIONS

This application is a continuation-in-part of application Ser. No. 919,658, filed Oct. 16, 1986, now abandoned, which in turn is a continuation-in-part of application Ser. No. 457,897, filed Jan. 14, 1983, now abandoned.

Reference is made to co-pending application Ser. No. 450,032, filed Dec. 15, 1982 in my name, now U.S. Pat. No. 4,528,176, and co-pending application Ser. No. 496,474, filed May 20, 1983, in the name of M. F. Gautreaux, now U.S. Pat. No. 4,456,584. Those applications and the present application are commonly assigned.

BACKGROUND

Of the known methods for synthesis of sodium aluminum hydride ($NaAlH_4$), the so-called "direct synthesis" process appears to offer the most promise. It involves reacting Na (or NaH), Al and $H_2$ under suitably elevated temperatures and pressures in an appropriate liquid reaction medium, such as an ether, amine or hydrocarbon. See in this connection:

E. C. Ashby, Chem. Ind. (London), 208 (1962);
E. C. Ashby et al., Inorg. Chem. 499 (1963);
E. C. Ashby, French Pat. 1,235,680 (May, 1960), and U.S. Pat. Nos. 4,045,545 and 4,081,524;
J. Murib, U.S. Pat. No. 3,556,740;
H. Clasen, Angew. Chem. 73, 322 (1961).

Among the drawbacks of the direct synthesis process are the relatively long induction periods that are usually encountered even when using activated aluminum. And, because of the sensitivity of Na (and NaH) to water and alcohols, it has been standard practice to carefully pre-dry or otherwise purify the liquid reaction medium before use. For example, it has been customary to dry the hydrocarbon media (e.g., toluene, hexane, trimethylhexane) over Na and to distill the ether media (e.g., diglyme, tetrahydrofuran, diethyl ether) over $NaAlH_4$ just prior to use.

Snyder, U.S. Pat. No. 3,387,949 discloses a process for making alkali metal hydrides by reaction of the metals and hydrogen. The process is carried out in the presence of a catalyst and the reactants and products are comminuted during the course of the reaction. The reference discloses additional comminution conducted before the reaction mixture is pressured with hydrogen.

SUMMARY OF THE INVENTION

This invention provides distinct improvements in the direct synthesis process for producing $NaAlH_4$. For one thing, it has been discovered that it is not necessary to carefully pre-dry or otherwise remove moisture and/or alcohol impurities from the reaction diluent prior to use in the process. In fact, it has been discovered that the presence in the diluent of small amounts of water and/or alcohols is actually beneficial in that it promotes the initiation of the reaction and thereby can significantly shorten the induction period that would otherwise be experienced under the same conditions when using the diluent in pre-dried, alcohol-free form. Without desiring to be bound or limited by theoretical considerations, it is believed that the alcohol and/or water initially present in the diluent forms in situ an active catalyst which tends to promote reaction start-up.

While any of the conventional liquid reaction media (e.g., hydrocarbons, ethers, amines) may be employed, a preferred embodiment of this invention involves use of an ether, most preferably a glycol dialkyl ether, notable the dimethyl ether of diethylene glycol (diglyme) or the dimethyl ether of ethylene glycol (monoglyme).

Alcohols that may be present in the initial reaction mixture (they will of course be consumed and converted into other forms in situ upon interaction with the active ingredient(s) or component(s) of the reaction system such as Na or NaH or $NaAlH_4$) include the alkanols and the glycol monoalkyl ethers, notably the monomethyl ether of diethylene glycol and the monomethyl ether of ethylene glycol. Such monohydric alcohol(s) may be present as naturally occurring impurities in the diluent introduced into the reaction system or may be deliberately added to the reaction mixture as a separate ingredient. Ordinary commercial grades of diglyme tend to contain small amounts (typically about 500 ppm) of the corresponding ether-alcohol, $CH_3OC_2H_4OC_2H_4OH$, and this ether-alcohol in such quantities contributes to the shortening of the induction period.

A small amount of water may be used in lieu of or in addition to the alcohol. Preferably the system will initially contain small amounts of both water and one or more alcohols. Small amounts of glycols may also be present or used, with or without water and/or monohydric alcohol.

In another embodiment there is provided an improved semi-continuous process for producing $NaAlH_4$. More particularly in a process for the preparation of sodium aluminum tetrahydride wherein reaction is effected among sodium, aluminum and hydrogen at an elevated temperature and pressure in a liquid ether reaction medium in which the sodium aluminum tetrahydride is soluble and wherein the reaction is performed in a semicontinuous manner whereby in successive runs the reaction is initiated by use of an aluminum-containing heel from the prior run, there is provided the improvement wherein the ether reaction medium employed in at least the initial run (and preferably in at least some of the ensuing runs) initially contains a small amount of water or an alcohol or both.

The aluminum used in the various embodiments of this invention can be of various grades and purities and is preferably finely divided. Pursuant to a preferred embodiment, I employ aluminum which contains a reaction promoting quantity of at least one of the metals: titanium, zirconium, hafnium, vanadium, niobium, uranium. The presence in the aluminum of at least a reaction-promoting quantity of titanium is especially preferred.

The process of this invention achieves good results without the pre-milling and comminution during the course of the reaction disclosed by Snyder. Furthermore, the amount of promoter metal utilized in this invention is much less than the amount of catalyst employed in the Snyder process.

These and other features and embodiments of this invention will be still further apparent from the ensuing description, appended claims, and accompanying drawing.

BRIEF DESCRIPTION OF THE DRAWING

The FIGURE of the Drawing represents in visual form the results of several experiments and illustrates the reaction-promoting effects observed when the reaction mixture initially contained in one case an alcohol and in another case both water and an alcohol.

DESCRIPTION OF PREFERRED EMBODIMENTS

The aluminum for the process may be in any of several forms, preferably some comminuted form such as shavings, turnings, flakes, filings, etc. Most preferably, it is in the form of a fine powder. Although not essential, it is preferred that the aluminum contain a reaction-promoting amount of Ti, Zr, Hf, V, Nb, or U. Most preferably one or more of such metals is present in the aluminum as an alloy, although other ways of introducing such metal(s) into the reaction system to enhance reaction rate may prove successful.

A suitable range for the reaction-promoting quantity of metal is about 300–2500 parts by weight per million parts aluminum. When employed in these amounts the ratio of aluminum to reaction-promoting metal is within the range of about 3300 to 1 to about 400 to 1. A preferred range is 450–2000 ppm. A more preferred range is about 1000–2000 ppm. The reaction of the invention generally proceeds at a faster rate with increased amounts of metal. The upper point of diminishing returns has not been determined. Particularly desirable and useful aluminum powders are sold under the trade designations I-783 by Reynolds Metals and 104-C by Alcoa.

Of the reaction promoting metals Ti and Zr are preferred because of their widespread availability although in some instances U may be preferred where available as a waste source or the like. Other similar metals may prove to be equivalent for this purpose. Titanium is deemed the most preferred reaction promoter for the aluminum.

The aluminum is preferably present in a stoichiometric excess of the amount of sodium being used. This excess is preferably such that the Al:Na gram-atom ratio is at least about 2:1, more preferably 3:1 or more. Use of such excesses of Al enhances the rate of the reaction once it has been initiated. Naturally one should take into consideration the amount of Na that will be consumed in reaction with the water and/or alcohol being charged into the initial reaction mixture.

As indicated above, the reaction is best carried out in an innocuous liquid reaction medium, i.e., a liquid medium that does not interfere with the inventive process. Any of a broad range of materials may be used for this purpose, including hydrocarbons (preferably paraffinic, cycloparaffinic or aromatic), ethers, amines, and the like. Exemplary hydrocarbons include n-hexane, n-heptane, 2,2,3-trimethylbutane, n-octane, 2-methylheptane, 3-methylheptane, 4-methylheptane, 2,2,4-trimethylpentane, n-decane, cyclohexane, 1,4-dimethylcyclohexane, decahydronaphthalene, toluene, ethylbenzene, and the like. Typical ethers include diethyl ether, ethylisopropyl ether, ethylisobutyl ether, dipropyl ether, ethylisoamyl ether, tetrahydrofuran, 1,4-dioxane, and the like. Amines, such as triethylamine, tributylamine, triamylamine, cyclohexyldimethylamine, N,N-dimethylaniline, etc., are also suitable. Mixtures of different materials of the same general class (e.g., two or more different ethers) or of different classes (e.g., an ether and a hydrocarbon) may be employed as the reaction medium.

Preferably the reaction medium is a glycol ether, especially a dilower alkyl ether of an alkylene glycol such as the dimethyl ether of ethylene glycol (monoglyme), the dimethyl ether of propylene glycol, the dimethyl ether of diethylene glycol (diglyme), the dimethyl ether of triethylene glycol (triglyme), the diethyl ether of ethylene glycol, and the like. Most preferred are diglyme and monoglyme.

The reaction is a pressure hydrogenation conducted at pressures of at least about 100 psig up to about 5000 psig. A preferred range is about 750–2000 psig. More preferred is 1000–2000 psig.

While the reaction will proceed at relatively low temperature, use of an elevated temperature is preferred. A suitable range is about 65°–300° C. depending upon the pressure and reaction medium employed. A preferred range is 100°–200° C. and a more preferred range is 120°–170° C. As indicated by E. C. Ashby et al. (loc. cit.) the most desirable temperature for use in any given situation will be influenced by such factors as the pressure, reaction medium and reaction time being used. In general, however, temperatures of about 140° to about 160° C. are usually most preferred.

The reaction should be carried out so that product sodium aluminum tetrahydride is readily recovered. A suitable range of weight percent product tetrahydride in the reaction medium is about 5–20 percent. A preferred range is 10–15 weight percent.

The reaction is preferably run with sodium as the limiting reactant.

Pursuant to one embodiment of this invention a suitable monohydric alcohol is introduced into the initial reaction mixture in an amount sufficient to enhance reaction startup (i.e., to shorten the induction period that would otherwise be experienced absent the alcohol). Usually amounts of alcohols ranging up to about 10 mole percent based on the amount of sodium charged will be sufficient, although somewhat higher amounts are feasible, though less preferred. Preferably the initial reaction mixture will contain up to about 5 mole percent of the alcohol(s) based on the amount of sodium charged. Suitable alcohols include the alkanols and cycloalkanols such as methanol, ethanol, propanol, isopropanol, butanol, isobutanol, sec-butanol, the pentanols, the hexanols and like longer chain liquid alkanols, cyclohexanol, the methylcyclohexanols, and the like. Etheralcohols such as 2-ethoxyethanol, 2-propoxyethanol, 4-methoxybutanol, etc., as well as the mono-lower alkyl ethers of polyalkylene glycols such as the monomethyl-, monoethyl-, monopropyl-, and monobutyl ethers of diethylene glycol and of triethylene glycol are also highly suitable. Mixtures of different alcohols can be used.

As noted above, the alcohol(s) may also be introduced into the initial reaction mixture as an impurity in the liquid being employed as the reaction medium, such as a glycol dialkyl ether. For example, unless highly purified, diglyme will usually contain small amounts of $CH_3OC_2H_4OC_2H_4OH$ and monoglyme will usually contain small amounts of $CH_3OC_2H_4OH$, the amounts being in the range of, say, 100 to 1000 ppm. Such alcohol impurities are suitable in the practice of this invention.

Preferably the initial reaction mixture will contain, in addition to or in lieu of the alcohol(s) a small amount of water so that reaction initiation is promoted. While the amounts of water may be varied within reason, amounts of up to about 2 to 3 mole percent based on the sodium charged will usually suffice. Here again the water may be separately charged to the initial reaction mixtures or introduced thereto as a component of or impurity in the reaction medium being charged. For example, good results have been obtained using diglyme typically having about 150 ppm of water and about 500 ppm $CH_3OC_2H_4OC_2H_4OH$ available as an article of commerce from Grant Chemical Company.

It will of course be self-evident that the amount of alcohol and/or water introduced into the initial reaction system will be limited so as not to consume an inordinate amount of the sodium charged nor to create a hazardous condition. Until considerable familiarity with the inventive process has been achieved, it is recommended that one start in any given system with an essentially anhydrous reaction mixture and carefully meter therein a small measured amount of the alcohol(s) and/or water and in this way determine the smallest amount required to give the desired reaction promotion effect under the particular reaction conditions selected for use.

A particularly desirable way in which to conduct the process is on a semi-continuous or cyclic basis with a reactive aluminum-containing heel or solid residue being carried through for successive cycles. All indications are that the cycles may be continued indefinitely without depletion of activating aluminum-containing material in the heel. This mode of operation offers the advantages of enhanced reactor utilization (increased through-put) and makes it possible to recover the $NaAlH_4$ in the form of a very useful product solution, especially when an ether such as diglyme or monoglyme is employed as the reaction medium. And in this embodiment, the use of a glycol dialkyl ether especially diglyme or monoglyme (or both) is in fact preferred.

In the semi-continuous mode of operation, upon completion of the first pressure hydrogenation reaction (or when the reaction has proceeded to the desired extent) the reaction mixture is allowed to settle and the supernatent solution of $NaAlH_4$ in the liquid reaction medium (e.g., diglyme, monoglyme, etc.) is decanted off leaving an active aluminum-containing heel in the reactor. A fresh charge of Na, Al and the liquid reaction medium is then introduced and the next pressure hydrogenation reaction is conducted under the appropriate reaction conditions selected, and thereafter the settling, decantation and recharging procedures are again repeated. In each case, the active aluminum-containing heel will cause the ensuing reaction to initiate very rapidly. Thus it is not necessary in the practice of this invention to introduce water and/or alcohol(s) into the ensuing reaction mixtures. However, a feature of this invention is that the liquid reaction medium being charged into these ensuing reactions need not be pre-dried and pre-purified to remove the small amounts of water and/or alcohol normally present therein. Thus the trouble, time and expense of such prepurification operations are avoided pursuant to this invention—reaction initiates and proceeds very well in the ensuing reactions notwithstanding the initial presence in the liquid medium of the small amounts of water and/or alcohol.

In the semi-continuous mode of operation, as in other modes such as batch operations, use of aluminum containing one or more of the above mentioned metals, especially Ti, for promoting the reaction is preferred, though not essential.

The following examples are presented for the purpose of further illustrating the practice and advantages of this invention. In these examples a series of pressure hydrogenation reactions were carried out under the same conditions with the exception that in one case (Example I) the initial reaction mixture contained no water or alcohol reaction initiator, in another case (Example II) the initial reaction mixture contained an alcohol reaction initiator, and in the third case (Example III) the initial reaction mixture contained both water and an alcohol as reaction initiators. In each of the experiments, use was made of a 300 mL autoclave equipped with a turbine stirrer, a cooling coil, an internal thermocouple for measuring reaction temperature, and appropriate hydrogen pressurization and vent lines. In all three experiments the diglyme used came from the same batch of product. In Examples I and II, a portion of the diglyme as received was pre-dried and pre-purified by distillation over $NaAlH_4$ whereas in Example III the diglyme was used as received.

Example I—Water- and Alcohol-Free System

Into the autoclave were charged 110 mL diglyme (prepurified by distillation from $NaAlH_4$ to remove all alcohol and water therefrom), 8.8 grams (0.382 mole) of sodium and 35 grams (1.296 moles) of aluminum containing 1900 ppm of titanium (Reynolds I-783 aluminum). With the turbine stirrer operated at 600 rpm, the system was sealed, pressurized with hydrogen to 1000 psig, and held at 140° C. until the pressure dropped to 800 psig. At this point, the system was repressurized to 1000 psig and the procedure repeated until reaction was completed. The times required to reach the repressurization stages were recorded and thus served as a means of indicating the extent of the induction period and the rapidity with which the reaction proceeded once the reaction was initiated. It was found that under these conditions reaction did not initiate until about 120 minutes after application of the pressure hydrogenation conditions (140° C./1000 psig hydrogen). Reaction was completed after a total time of about 210 minutes. The results of this experiment are plotted in the accompanying FIGURE—see the right-hand curve bearing the legend "pure, dry diglyme".

The above procedure was conducted in an essentially similar fashion using:

| Reactant | Amount | Moles |
|---|---|---|
| Sodium | 8.0 grams | 0.348 moles |
| Aluminum | 27.0 grams | 1.0 moles |
| Diglyme | 110 ml | |

The mole ratio of aluminum to sodium was (1.0÷0.348) or 2.87. Since the reaction utilizes equimolar portions of sodium and aluminum, there was an excess equivalent to (2.87−1.0), or 1.87 moles of aluminum. In this run, the total pressure drop was 1425 psi.

After the reaction was complete, the solids were removed by filtration and the filter cake washed with diglyme. The filtrate and washings amounted to 169.8 grams of solution. The sodium aluminum hydride yield was determined by hydrogen analysis. The hydrogen was evolved by hydrolysis of the $NaAlH_4$ product. Results indicated there was 7.98 mmoles of $H_2$/gram, or a yield of 97.3%.

A plot of pressure drop versus time for this run, was essentially the same (as shown in the FIGURE) for the run reported above. Again, it took above two hours for the reaction to initiate.

The titanium content of the aluminum was 1900 ppm, i.e. the same concentration as in the run reported above. Therefore, the amounts of titanium present in these runs were:

35 g×1900 ppm Ti=0.665 g Ti 27 g×1900 ppm Ti=0.513 g Ti

However, since the titanium is alloyed with the aluminum, only the titanium released by reaction of the aluminum is available for catalysis. Since the yield was 97.3% when 27.0 grams of aluminum was used, the amount of titanium available for catalysis was:

$$= \frac{0.348 \times 27 \times 1900 \times 0.973}{10^6}$$

= 0.0178 g of titanium

In this procedure, the filtration is tedious. Accordingly, in all other runs reported herein the total drop in hydrogen pressure is used as an indicator of yield.

Example II—Use of Alcohol Reaction Promoter

The procedure of Example I was repeated with the exception that to the initial anhydrous alcohol-free mixture there was added 2 grams (0.033 mole) of reagent grade isopropanol. There was used, 8.8 grams of sodium; (0.382 moles) and 35.0 grams of aluminum; (1.296 moles). After reaction with the isopropanol, the amount of sodium available for reaction in the hydrogenation procedure was about 0.349 moles; since the isopropanol charged was equivalent to about 0.033 moles. This pressure hydrogenation reaction initiated after only about 20 minutes after the application of the above pressure hydrogenation conditions. The curve in the figure bearing the legend "pure, dry diglyme & isopropanol" depicts the experimental results of this example. The total pressure drop was about 1450 psi; hence the yield of NaAlH$_4$ was about the same as above.

Example III—Use of Alcohol and Water Reaction Promoters

The procedure of Example I was again repeated except that in this instance the diglyme charged to the system was used as received from the manufacturer (Grant Chemical Company). According to the manufacturer, such diglyme typically contains about 150 ppm of water and about 500 ppm of alcohol (CH$_3$OC$_2$H$_4$OC$_2$H$_4$OH). The amount of materials used were 110 ml of diglyme, 8.0 grams of sodium, and 35.0 grams of aluminum. It was found that the pressure hydrogenation reaction initiated about 40 minutes after the application of the pressure hydrogenation conditions. The results of this experiment are graphically depicted in the figure as the curve bearing the legend "crude, wet diglyme". The total pressure drop was 1500 psi, hence the yield of NaAlH$_4$ was about the same as for the runs reported above.

While this invention has been discussed primarily with reference to use of sodium as one of the initial reactants (and use of Na is definitely preferred), it is contemplated that the improvements described herein may be achieved when using sodium hydride instead of sodium.

As is well known in the art and reported in the literature, sodium aluminum tetrahydride is useful as a chemical reducing agent in a variety of applications.

It will now be clear to those skilled in the art that this invention is susceptible to considerable variation in its practice without departing from its true spirit and lawful scope.

I claim:

1. In a process for the preparation of sodium aluminum tetrahydride by reaction of sodium, aluminum and hydrogen at an elevated temperature and pressure in a glycol dialkyl ether liquid reaction medium, the improvement wherein the liquid reaction medium initially contains an amount up to 3 mole percent of water or up to 10 mole percent of an alcohol or both sufficient to promote initiation of the reaction so as to significantly shorten the induction period that would otherwise be experienced under the same conditions when using said liquid reaction medium in pre-dried, alcohol-free form.

2. The process of claim 1 wherein said ether is the dimethyl ether of diethylene glycol.

3. The process of claim 1 wherein said ether is the dimethyl ether of ethylene glycol.

4. The process of claim 1 further characterized in that said glycol dialkyl ether initially contains a small amount of water and glycol monoalkyl ether sufficient to initiate the reaction.

5. The process of claim 4 wherein said ether is the dimethyl ether of diethylene glycol.

6. The process of claim 4 wherein said ether is the dimethyl ether of ethylene glycol.

7. The process of claim 1 wherein said aluminum contains a reaction-promoting quantity of at least least one of the metals: titanium, zirconium, hafnium, vanadium, niobium, uranium.

8. The process of claim 1 wherein said aluminum contains at least a reaction-promoting quantity of titanium.

9. The process as claimed in claim 1 in which the liquid reaction medium contains an alcohol.

10. The process as claimed in claim 1 in which said liquid reaction medium contains water.

11. The process of claim 1 being conducted in the presence of a promoter quantity of isopropanol.

12. The process of claim 1 being conducted in the presence of CH$_3$OC$_2$H$_4$OC$_2$H$_4$OH.

13. The process of claim 1 being conducted at a pressure of 1000–2000 psig.

14. In a process for the preparation of sodium aluminum tetrahydride wherein reaction is effected among sodium, aluminum and hydrogen at an elevated temperature and pressure in a glycol dialkyl ether reaction medium in which the sodium aluminum tetrahydride is soluble and wherein the reaction is performed in a semi-continuous manner whereby in successive runs the reaction is initiated by use of an aluminum-containing heel from the prior run, the improvement wherein the ether reaction medium employed in at least the initial run initially contains up to 3 mole percent of water or up to 10 mole percent of an alcohol or both sufficient to promote initiation of the reaction so as to significantly shorten the induction period that would otherwise be experienced under the same conditions when using said liquid reaction medium in pre-dried, alcohol-free form.

15. The process of claim 14 wherein said ether is the dimethyl ether of diethylene glycol.

16. The process of claim 14 wherein said ether is the dimethyl ether of ethylene glycol.

17. The process of claim 14 wherein the aluminum employed in at least some of the runs contains a reaction-promoting quantity of at least least one of the metals: titanium, zirconium, hafnium, vanadium, niobium, uranium.

18. The process of claim 14 wherein the aluminum employed in at least some of the runs contains at least a reaction-promoting quantity of titanium.

19. The process of claim 14 wherein in the initial run and in at least some of the successive runs the aluminum employed contains a reaction-promoting quantity of at least least one of the metals: titanium, zirconium, hafnium, vanadium, niobium, uranium.

20. The process of claim 14 wherein in the initial run and in at least some of the successive runs the aluminum employed contains at least a reaction-promoting quantity of titanium.

21. In a process for the preparation of sodium aluminum tetrahydride wherein reaction is effected among sodium, aluminum and hydrogen at an elevated temperature and pressure in a liquid glycol dialkyl ether reaction medium in which the sodium aluminum tetrahydride is soluble and wherein the reaction is performed in a semi-continuous manner whereby in successive runs the reaction is initiated by use of an aluminum-containing heel from the prior run, the improvement wherein the ether reaction medium employed in the initial run and in at least some of the successive runs initially contains up to 3 mole percent of water or up to 10 mole percent of an alcohol or both sufficient to promote initiation of the reaction so as to significantly shorten the induction period that would otherwise be experienced under the same conditions when using said liquid reaction medium in pre-dried, alcohol-free form.

22. The process of claim 21 wherein the aluminum employed in at least some of the runs contains at least a reaction-promoting quantity of titanium.

23. In a process for the preparation of sodium aluminum tetrahydride by reaction of sodium, aluminum and hydrogen at an elevated temperature and pressure in a liquid reaction medium, the improvement wherein the liquid reaction medium is a glycol dialkyl ether and initially contains up to 10 mole percent of isopropanol sufficient to promote initiation of the reaction so as to significantly shorten the induction period that would otherwise be experienced under the same conditions when using said liquid reaction medium in pre-dried, alcohol-free form.

24. The process as claimed in claim 23 in which said isopropanol is present in an amount of up to 5 mole percent based on the amount of sodium.

* * * * *